US009003102B2

(12) United States Patent
Lassa (10) Patent No.: US 9,003,102 B2
(45) Date of Patent: Apr. 7, 2015

(54) CONTROLLER WITH EXTENDED STATUS REGISTER AND METHOD OF USE THEREWITH

(75) Inventor: Paul A. Lassa, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 125 days.

(21) Appl. No.: 13/218,935

(22) Filed: Aug. 26, 2011

(65) Prior Publication Data
US 2013/0054871 A1 Feb. 28, 2013

(51) Int. Cl.
G06F 12/00 (2006.01)
G06F 13/00 (2006.01)
G06F 13/28 (2006.01)
G06F 3/06 (2006.01)
G06F 9/30 (2006.01)

(52) U.S. Cl.
CPC ............ *G06F 3/061* (2013.01); *G06F 9/30101* (2013.01); *G06F 3/0626* (2013.01); *G06F 3/0653* (2013.01); *G06F 3/0658* (2013.01); *G06F 3/0679* (2013.01)

(58) Field of Classification Search
CPC ... G06F 9/30101; G06F 9/462; G06F 9/3885; G06F 21/74
USPC .................................................. 711/103, 156
See application file for complete search history.

(56) References Cited

U.S. PATENT DOCUMENTS

| 6,034,882 | A | 3/2000 | Johnson et al. |
| 6,185,122 | B1 | 2/2001 | Johnson et al. |
| 6,420,215 | B1 | 7/2002 | Knall et al. |
| 6,631,085 | B2 | 10/2003 | Kleveland et al. |
| 7,013,336 | B1 | 3/2006 | King |
| 7,081,377 | B2 | 7/2006 | Cleeves |
| 7,366,029 | B2 | 4/2008 | Kagan |
| 7,631,245 | B2 | 12/2009 | Lasser |
| 7,676,616 | B2 | 3/2010 | Beardsley et al. |
| 2003/0154326 | A1* | 8/2003 | Tseng et al. ...................... 710/1 |
| 2005/0068971 | A1* | 3/2005 | Meisl et al. .................... 370/401 |

(Continued)

OTHER PUBLICATIONS

"PC Card Standard", http://affon.narod.ru/02el80.pdf, 2001, PCMCIA/JEITA, p. 58.*

(Continued)

*Primary Examiner* — Charles Rones
*Assistant Examiner* — Sidney Li
(74) *Attorney, Agent, or Firm* — Brinks Gilson & Lione (57) ABSTRACT

The embodiments described herein provide a controller with an extended status register and a method of use therewith. In one embodiment, a controller is provided with a first interface through which to communicate with a host and a second interface through which to communicate with a plurality of flash memory devices. The controller also comprises a status register, an extended status register, and a processor. The processor is operative to store, in the extended status register, status information of a plurality of events in time across the plurality of flash memory devices. The extended status register stores event status information, whereas the ONFI status register stores command status information. In response to a request from the host, the processor sends the status information of the plurality of events to the host for analysis.

24 Claims, 9 Drawing Sheets

(56) References Cited

U.S. PATENT DOCUMENTS

| | | |
|---|---|---|
| 2005/0097569 A1* | 5/2005 | Chandrasekaran ........... 719/318 |
| 2010/0023800 A1 | 1/2010 | Harari et al. |
| 2011/0040924 A1* | 2/2011 | Selinger ........................ 711/103 |
| 2011/0041005 A1 | 2/2011 | Selinger |
| 2011/0041039 A1 | 2/2011 | Harari et al. |
| 2011/0161554 A1 | 6/2011 | Selinger et al. |
| 2011/0161784 A1 | 6/2011 | Selinger et al. |

OTHER PUBLICATIONS

U.S. Appl. No. 12/982,833 entitled, "Controller and Method for Performing Background Operations", inventors: Lassa et al., filed Dec. 30, 2010, 40 pages.

* cited by examiner

| Value | 7 | 6 | 5 | 4 | 3 | 2 | 1 | 0 |
|---|---|---|---|---|---|---|---|---|
| ONFI Status Register | WP_n | RDY | ARDY | VSP | CSP | R | FAILC | FAIL |

FIG. 6

| time: t1 | t2 | t(h) | t(i) | t(i+1) | t(j) | t(j+1) |
|---|---|---|---|---|---|---|
| Host Read Cmd | | | Host initiates data transfer | | Host "PASS/FAIL" status register | |
| | Target/Flash responds to Read request | Target Read operation complete | | Target provides data | | Target provides "status" value |

FIG. 7

| H | | | | H | H | | | H | | |
|---|---|---|---|---|---|---|---|---|---|---|
| | T | | | | T | T | | | T | |

FIG. 8

| H | | | | | | | | H | | |
|---|---|---|---|---|---|---|---|---|---|---|
| | T | | | T | | T | | | T | |

CONTROLLER WITH EXTENDED STATUS REGISTER AND METHOD OF USE THEREWITH

BACKGROUND

A solid state drive (SSD) is designed to provide reliable and high performance storage of user data across a flash-based memory system containing a host interface controller (such as a Serial Advanced Technology Attachment (SATA)) interface) and a number of memory multi-chip packages (MCPs), where each MCP contains a flash memory controller and a stack of NAND flash dies. The Open NAND Flash Interface (ONFI) protocol provides support for parallel access to multiple NAND dies (or "logical units" (LUNs)) on a single "target" or NAND multi-chip stack on a single shared ONFI channel. In a typical SATA-based SSD application, a central host controller accesses multiple attached devices (targets/NAND device clusters) on each ONFI channel, and across several ONFI channels. Each ONFI target typically controls 2, 4, or 8 NAND dies. Storage management software running on the host controller manages a virtual memory space that is mapped to flash blocks in the physical dies in each of the attached MCP's. The host controller and the storage management software utilize parallel access and efficient usage of the available flash devices to optimize SSD drive performance, endurance, and cost.

In the ONFI standard, the only basic status reporting for a NAND erase, program, or read operation is a single shared pass/fail bit in a status register. On a command-by-command basis, the host reads the pass/fail bit in the status register to see if that particular command has passed or failed. Other industry standard storage interface protocols, such as SCSI or PCIexpress, support more extensive status reporting, as well as target-initiated event reporting. This can be implemented with bus interrupts from a target to the host or by utilizing a "mailbox function" where the target device initiates a bus transaction to write into the host controller's memory space or a shared space in the host memory. However, the ONFI protocol does not support this model.

SUMMARY

The present invention is defined by the claims, and nothing in this section should be taken as a limitation on those claims.

By way of introduction, the embodiments described below provide a controller with extended status register and a method of use therewith. In one embodiment, a controller is provided with a first interface through which to communicate with a host and a second interface through which to communicate with a plurality of flash memory devices. The controller also comprises a status register, an extended status register, and a processor. The processor is operative to store, in the extended status register, status information of a plurality of events in time across the plurality of flash memory devices. The extended status register stores event status information, whereas the status register stores command status information. In response to a request from the host, the processor sends the status information of the plurality of events to the host for analysis.

Other embodiments are disclosed, and each of the embodiments can be used alone or together in combination. The embodiments will now be described with reference to the attached drawings.

DETAILED DESCRIPTION OF THE PRESENTLY PREFERRED EMBODIMENTS

Introduction

As discussed above, the only basic status reporting for a NAND erase, program, or read operation in the ONFI standard is a single shared pass/fail bit in a status register. On a command-by-command basis, the host reads the pass/fail bit in the status register to see if that particular command has passed or failed. As will be discussed in more detail below, several disadvantages may be encountered with this approach to status reporting. For example, while a single-bit flag informs the host whether a read, program, or erase command has failed or not, it does not provide information about why the command failed. Accordingly, it does not provide the host with information that it can use to best determine what corrective action to take. As another example, because the target only responds with the result of the status register after being queried by the host in the ONFI standard, the target only provides status information when the status register is explicitly read by the host. Accordingly, if the controller issues background or internal commands that are initiated by the controller and not by the host, the host will not know to collect status information for such commands.

The following embodiments can be used to overcome these and other problems by providing a controller with an extended status register. As will be discussed in more detail below, the controller stores information in the extended status register for a plurality of events in time across a plurality of flash memory devices. The extended status register stores event status information, whereas the ONFI status register stores command status information. In response to a request from the host, the processor provides the status information of the plurality of events to the host for analysis.

Before turning to details of the extended status register embodiments, the following section discusses exemplary controller architectures that can be used with these embodiments.

Exemplary Controller Architectures

Figure 1:
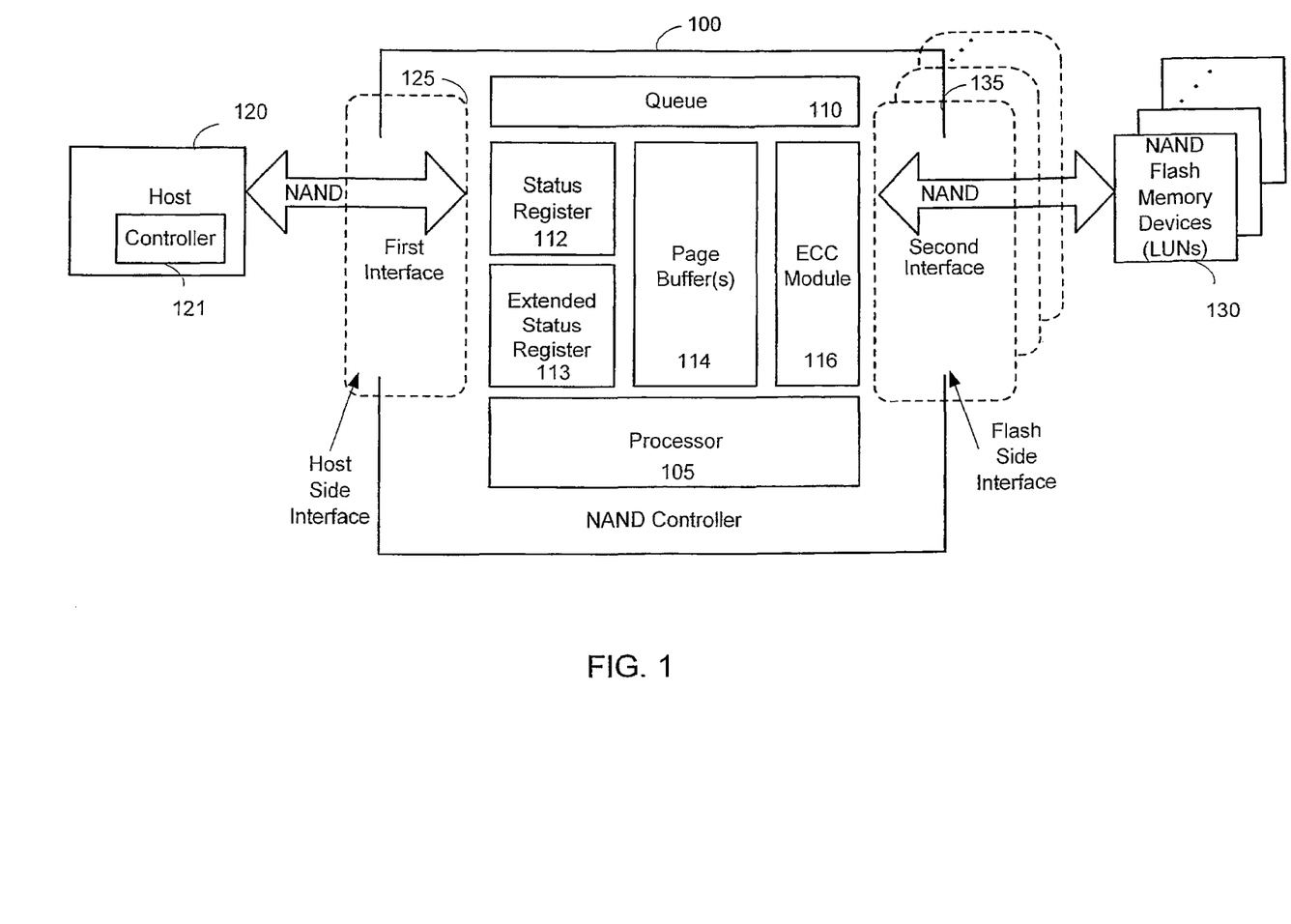
FIG. 1 is a block diagram of an exemplary controller of an embodiment.

Turning now to the drawings, FIG. 1 is a block diagram of an exemplary controller 100 of an embodiment. As shown in FIG. 1, the controller 100 is in communication with a host 120 (having a host controller 121) through a first interface 125 and is in communication with one or more NAND flash memory device(s) (or "logical units" (LUNs)) 130 through one or more second interface(s) 135. (The host controller in solid state drive (SSD) applications can have one or more first NAND interfaces (e.g., eight channels), in which case the controller 100 can see only one of those channels.) As used herein, the phrase "in communication with" means directly in communication with or indirectly in communication with through one or more components, which may or may not be shown or described herein. Also, while the controller 100 and flash memory device(s) 130 are shown as two separate boxes, it should be understood that the controller 100 and flash memory device(s) 130 can be arranged in any suitable manner (e.g., packaged in different packages, packaged within a common multi-chip package, and or integrated on a same die). In any of these arrangements, the controller can be physically located separately from the host. This allows the controller and flash memory device(s) to be considered a separate circuitry unit, which can be used in a wide variety of hosts.

A "host" is any entity that is capable of accessing the one or more flash memory device(s) 130 through the controller 100, either directly or indirectly through one or more components named or unnamed herein. A host can take any suitable form, such as, but not limited to, a personal computer, a mobile phone, a game device, a personal digital assistant (PDA), an email/text messaging device, a digital camera, a digital media (e.g., MP3) player, a GPS navigation device, a personal navigation system (PND), a mobile Internet device (MID), and a TV system. Depending on the application, the host 120 can take the form of a hardware device, a software application, or a combination of hardware and software.

"Flash memory device(s)" refer to device(s) containing a plurality of flash memory cells and any necessary control circuitry for storing data within the flash memory cells. In one embodiment, the flash memory cells are NAND memory cells, although other memory technologies, such as passive element arrays, including one-time programmable memory elements and/or rewritable memory elements, can be used. (It should be noted that, in these embodiments, a non-NAND-type flash memory device can still use a NAND interface and/or NAND commands and protocols.) One example of a passive element array is a three-dimensional memory array. As used herein, a three-dimensional memory array refers to a memory array comprising a plurality of layers of memory cells stacked vertically above one another above a single silicon substrate. In this way, a three-dimensional memory array is a monolithic integrated circuit structure, rather than a plurality of integrated circuit devices packaged or die-bonded in close proximity to one another. Although a three-dimensional memory array is preferred, the memory array can instead take the form of a two-dimensional (planar) array. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 6,034,882; 6,185,122; 6,420,215; 6,631,085; and 7,081,377. Also, the flash memory device(s) 130 can be a single memory die or multiple memory dies. Accordingly, the phrase "a flash memory device" used in the claims can refer to only one flash memory device or more than one flash memory device.

As shown in FIG. 1, the controller 100 also comprises a processor 105, a queue (memory) 110, one or more status registers 112, one or more extended status registers 113, one or more page buffers 114, and an error correction code (ECC) module 116. (The controller 100 can contain other components, which are not shown in FIG. 1 to simplify the drawing.) As used herein, a "module" can include hardware, software, firmware, or any combination thereof. Examples of forms that a "module" can take include, but are not limited to, one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. While only one module (the ECC module 116) is shown in FIG. 1, it should be understood that one or more additional modules for providing other functionality can be used. Examples of these additional modules include, but are not limited to, data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). Further information about these various functions is described in U.S. patent application Ser. Nos. 12/539,394; 12/539,407; 12/539,379; 12/650,263; 12/650,255; and 12/539,417, which are hereby incorporated by reference.

As noted above, the controller 100 communicates with the host 120 using a first interface 125 and communicates with the flash memory device(s) 130 using second interface(s) 135. The first and second interfaces can be NAND interfaces operating under NAND interface protocols. Examples of NAND interfaces include, but are not limited to, Open NAND Flash Interface (ONFI), toggle mode (TM), and a high-performance flash memory interface, such as the one described in U.S. Pat. No. 7,366,029, which is hereby incorporated by reference. The controller 100 may optionally include one or more additional host-side interfaces, for interfacing the controller 100 to hosts using non-NAND interfaces, such as SD, USB, SATA, or MMC interfaces. Also, the interfaces 125, 135 can use the same or different NAND interface protocols.

In general, a NAND interface protocol is used to coordinate commands and data transfers between a NAND flash device and a host using, for example, data lines and control signals, such as ALE (Address Latch Enable), CLE (Command Latch Enable), and WE# (Write Enable). Even though the term "NAND interface protocol" has not, to date, been formally standardized by a standardization body, the manufacturers of NAND flash devices all follow very similar protocols for supporting the basic subset of NAND flash functionality. This is done so that customers using NAND devices within their electronic products could use NAND devices from any manufacturer without having to tailor their hardware or software for operating with the devices of a specific vendor. It is noted that even NAND vendors that provide extra functionality beyond this basic subset of functionality ensure that the basic functionality is provided in order to provide compatibility with the protocol used by the other vendors, at least to some extent.

A given device (e.g., a controller, a flash memory device, a host, etc.) is said to comprise, include, or have a "NAND interface" if the given device includes elements (e.g., hardware, software, firmware, or any combination thereof) necessary for supporting the NAND interface protocol (e.g., for interacting with another device using a NAND interface protocol). (As used herein, the term "interface(s)" can refer to a single interface or multiple interfaces. Accordingly, the term "interface" in the claims can refer to only one interface or more than one interface.) In this application, the term "NAND Interface protocol" (or "NAND interface" in short) refers to an interface protocol between an initiating device and a responding device that, in general, follows the protocol between a host and a NAND flash device for the basic read, write, and erase operations, even if it is not fully compatible with all timing parameters, not fully compatible with respect to other commands supported by NAND devices, or contains additional commands not supported by NAND devices. One suitable example of a NAND interface protocol is an interface protocol that uses sequences of transferred bytes equivalent in functionality to the sequences of bytes used when interfacing with a Toshiba TC58NVG1S3B NAND device (or a Toshiba TC58NVG2D4B NAND device) for reading (opcode 00H), writing (opcode 80H), and erasing (opcode 60H), and also uses control signals equivalent in functionality to the CLE, ALE, CE, WE, and RE signals of the above NAND device.

It is noted that a NAND interface protocol is not symmetric in that the host—not the flash device—initiates the interaction over a NAND interface. Further, an interface (e.g., a NAND interface or an interface associated with another protocol) of a given device (e.g., a controller) may be a "host-side interface" (e.g., the given device is adapted to interact with a host using the host-side interface), or the interface of the given device may be a "flash memory device-side interface" (e.g., the given device is adapted to interact with a flash memory device using the flash memory device-side interface). The terms "flash memory device-side interface," "flash device-side interface," and "flash-side interface" are used interchangeably herein.

These terms (i.e., "host-side interface" and "flash device-side interface") should not be confused with the terms "host-type interface" and "flash-type interface," which are terminology used herein to differentiate between the two sides of a NAND interface protocol, as this protocol is not symmetric. Furthermore, because it is the host that initiates the interaction, we note that a given device is said to have a "host-type interface" if the device includes the necessary hardware and/or software for implementing the host side of the NAND interface protocol (i.e., for presenting a NAND host and initiating the NAND protocol interaction). Similarly, because the flash device does not initiate the interaction, we note that a given device is said to have a "flash-type interface" if the device includes the necessary hardware and/or software for implementing the flash side of the NAND protocol (i.e., for presenting a NAND flash device).

Typically, "host-type interfaces" (i.e., those which play the role of the host) are "flash device-side interfaces" (i.e., they interact with flash devices or with hardware emulating a flash device) while "flash device-type interfaces" (i.e., those which play the role of the flash device) are typically "host-side interfaces" (i.e., they interact with hosts or with hardware emulating a host).

Additional information about exemplary controllers (and their advantages over prior controllers) can be found in U.S. Pat. No. 7,631,245 and U.S. patent application Ser. Nos. 12/539,394; 12/539,407; 12/539,379; 12/650,263; 12/650,255; and 12/539,417, which are hereby incorporated by reference.

Figure 2:
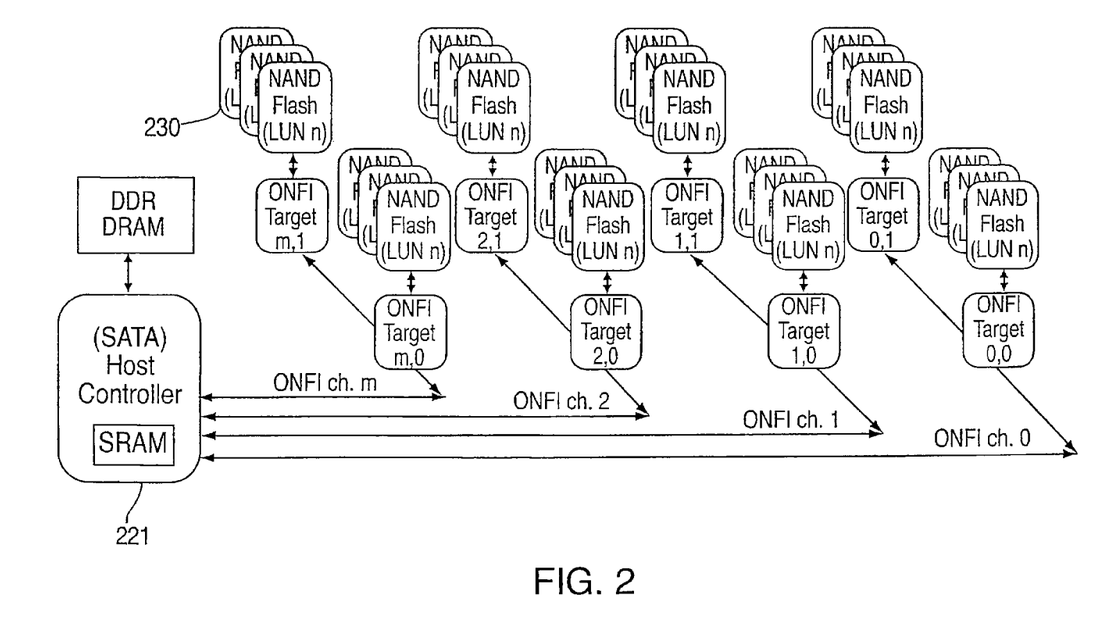
FIG. 2 is a block diagram of a solid state drive of an embodiment.

It should be noted that the controller 100 and flash memory device(s) 130 can be used in any desired system environment. For example, in one implementation, a product manufactured with one or more controller 100/flash memory device(s) 130 units is used in a solid-state drive (SSD). An example of a SATA-based SSD application is shown in FIG. 2, where a central host controller 221 accesses (on each ONFI channel and across several ONFI channels) multiple attached ONFI targets, where each ONFI target contains a controller similar to the controller 100 in FIG. 1 and is connected to a plurality of NAND flash devices 230. As another example, the controller 100 can be used in OEM designs that use a Southbridge controller to interface to flash memory devices.

Figure 3:
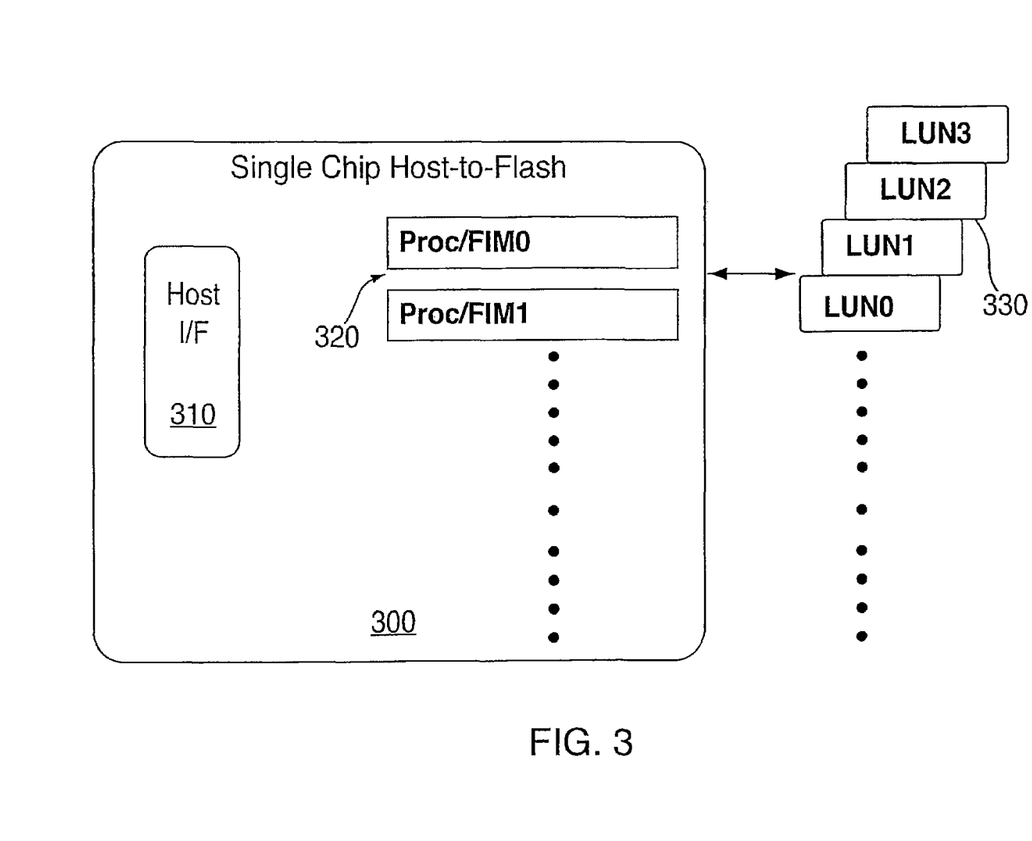
FIG. 3 is a block diagram of an architecture of an embodiment.
Figure 4:
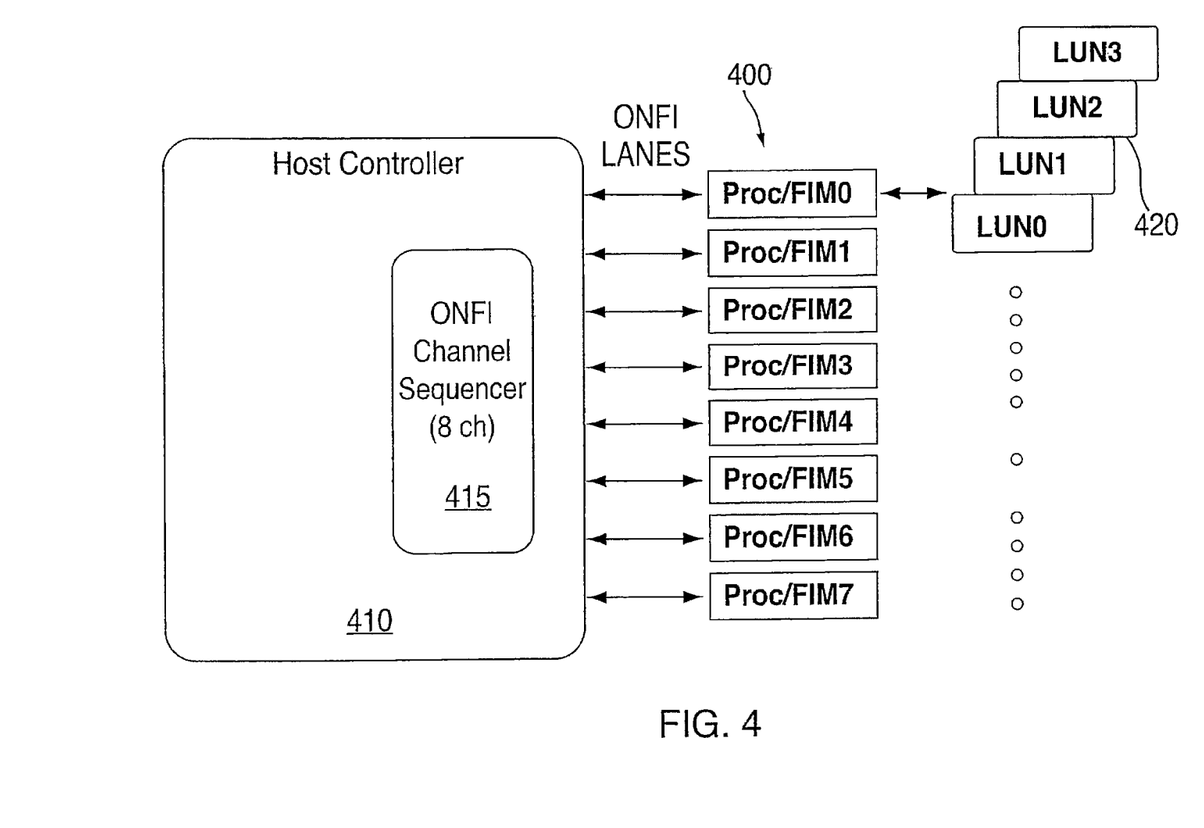
FIG. 4 is a block diagram of an architecture of an embodiment.
Figure 5:
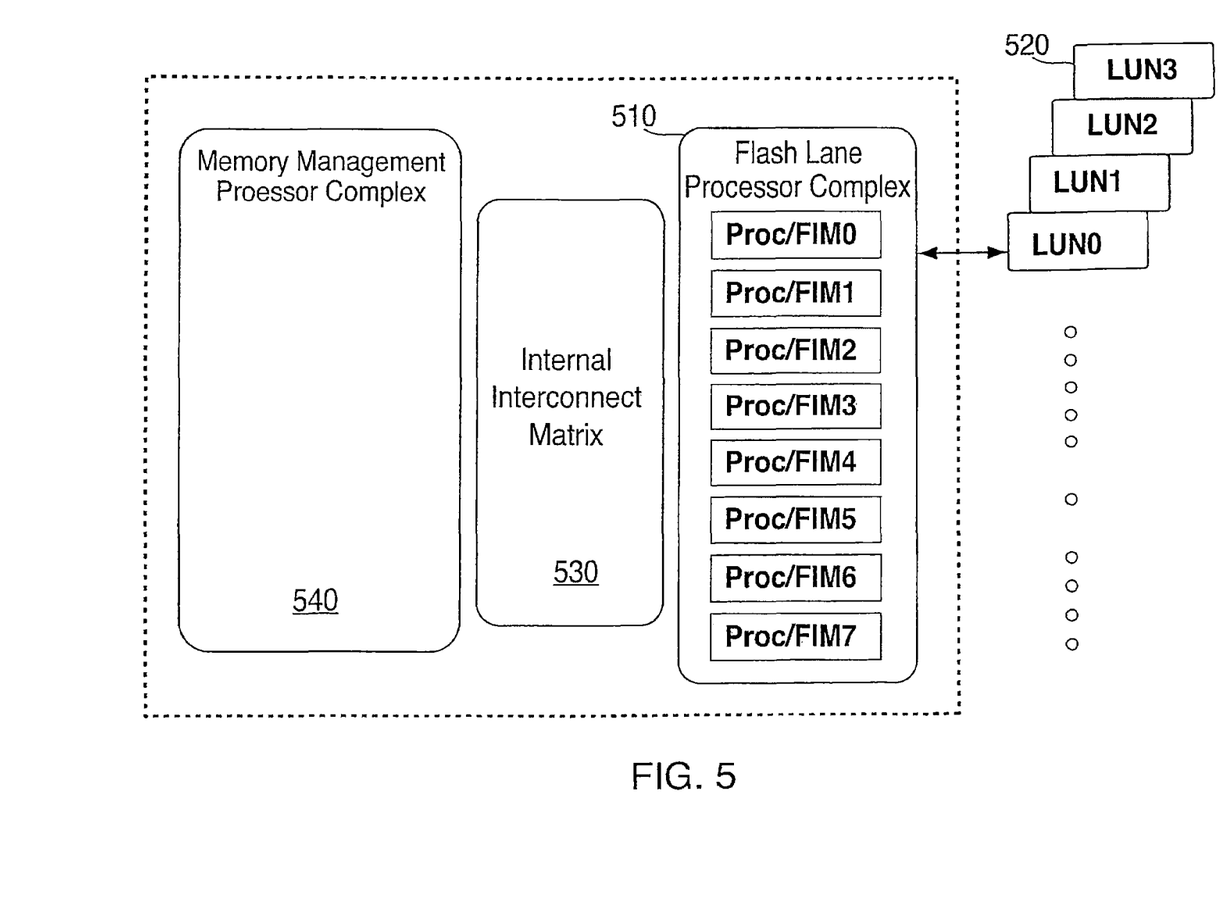
FIG. 5 is a block diagram of an architecture of an embodiment.

It should also be noted that other controller architectures can be used. For example, FIG. 3 illustrates a single chip host-to-flash controller 300. This controller 300 contains a host interface 310 and a plurality of processor/flash interface modules (FIMs) 320. Each of the processor/FIMs is connected to a respective plurality of flash Memory devices (LUNs). In another embodiment (shown in FIG. 4), instead of the plurality of processor/FIMs being inside a single controller, each processor/FIM 400 communicates individually with an ONFI channel sequencer 415 in the host controller via respective ONFI lanes. As in FIG. 3, each processor/FIM 400 in this embodiment is connected to a plurality of flash memory devices (LUNs) 420. In yet another embodiment (shown in FIG. 5), the controller contains a flash lane processor complex 510 that contains a plurality of processor/FIMs connected to a plurality of flash memory devices (LUNs) 520. The flash lane processor complex 525 is connected via an internal interconnect matrix 530 to a memory management processor complex 540, that manages the operation of the memory. Of course, these are just examples of some of the architectures that can be used; others can be used. The claims should not be limited to a particular type of architecture unless explicitly recited therein.

The three example architectures above illustrate the variations on how a host platform (PC, laptop, etc.), host interface controller (such as SATA, PCIe, etc.), or simply one or more host processes or execution threads within an integrated storage complex or SOC may produce a plurality of memory storage, memory management, or device maintenance or health operations destined for one or more exemplary Flash Memory controller Lanes, processes, or execution threads.

Now that exemplary controller architectures have been described, the following section provides more information about the embodiments related to the extended status register.

Embodiments Relating to the Status Register and the Extended Status Register

Figure 6:
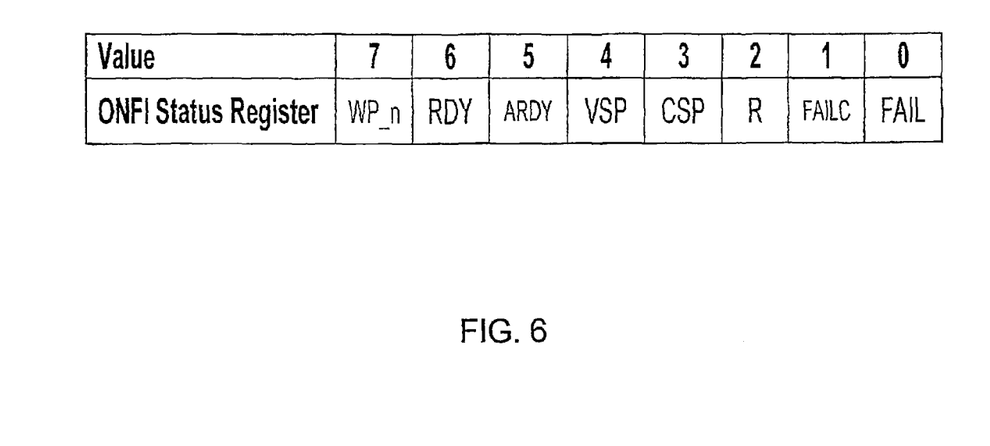
FIG. 6 is an illustration of an exemplary status register of an embodiment.

In this embodiment, the status register 112 takes the form of an ONFI status register. In one particular implementation, there are 8 LUNs, and one status register 112 per LUN. FIG. 6 is an illustration of an exemplary status register 112. As shown in FIG. 6, this status register 112 has 8 fields, although different implementations can be used. In this particular implementation, the 8 fields are: FAIL, FAILC, R, CSP, VSP, ARDY, RDY, and WP_n. The following is a description of these fields:

FAIL—If set to one, the last command failed. If cleared to zero, the last command was successful. In one embodiment, this bit is valid for read, program, and erase operations.

FAILC—This bit is used with cached commands, which, in some embodiments, is not supported.

R—Reserved.

CSP (Command Specific)—This bit has command-specific meaning. In some embodiments, for read operations, if the CSP bit is set to one, the last read operation exceeded the ECC threshold, and the host controller 121 should take appropriate action (e.g., re-write the data to a new location). When FAIL is set to one, the CSP bit is "don't care." For other operations, this bit is reserved.

VSP—Vendor specific.

ARDY—This bit is used with cached commands, which, in some embodiments, is not supported.

RDY—If set to one, the LUN or plane address is ready for another command and all other bits in the status value are valid. If cleared to zero, the last command issued is not yet complete and status register bits 5:0 are invalid and should be ignored by the host 120. When caching operations are in use, this bit indicates whether another command can be accepted, and ARDY indicates whether the last operation is complete.

WP_n—Write protected

In general, the status register 112 indicates the status of a single command (e.g., erase, program, or read), and the host controller 121 can check the status register 112 by issuing a read status command immediately following a command's issuance. For example, in response to a read command from the host controller 121, the NAND controller 100 can read data from the appropriate LUN 130, transfer the data through the ECC module 116, and store the corrected data in the page buffer 114. The host controller 121 can poll the status register 112 to see whether a ready/busy field in the status register 112 indicates that the command is complete and whether a success/fail bit in the status register 112 indicates that the command was successful. If the status register 112 indicates that the command is complete and that it was successful, the host controller 121 can then read the data out of the page buffer 114.

As can be seen from the above, the ONFI standard only defines a single error flag. So, the only basic status reporting for a NAND erase, program, or read operation is a single shared pass/fail bit in the FAIL field. The FAIL bit being set to one indicates that the last command failed, whereas the FAIL bit being cleared to zero indicates that the last command was successful. As can also be seen from the above, checking the status register 112 in the ONFI standard is a host-initiated operation, with the target being response only.

Figure 7:
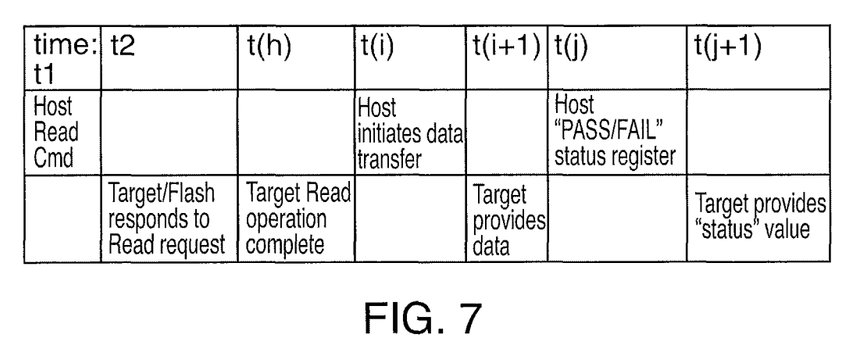
FIG. 7 is a chart that illustrates the use of a status register in the ONFI standard.

FIG. 7 is a chart that illustrates these "single flag" and "host initiated" concepts in the ONFI standard when the host 120 issues a read command. As shown in FIG. 7, at time t1, the host 120 issues a read command to the controller 100 of the target/flash assembly. At time t2, the target responds to the read request, and, at some later time (time t(h)), the target read operation is complete. The read operation would result in data being read from the NAND flash memory device(s) 130 and stored in the controller's page buffer(s) 114. Then, at time t(i), the host 120 initiates a data transfer, and the target provides the data from the page buffer(s) 114 to the host 120. The host 120 then reads the FAIL field in the status register 112, and the target controller 200 provides the status value. As mentioned above, in this implementation, if the FAIL bit is one, the host 120 would know that the read operation failed and would need to re-send the read command or take some other corrective action. Alternatively, if the FAIL bit is zero, the host 120 would know that the read operation was successful.

There are several disadvantages that can be encountered when using the status register 112 as defined in the ONFI standard. First, while the single-bit flag informs the host 120 whether a read, program, or erase command has failed or not, it does not provide information about why the command failed. Accordingly, it does not provide the host 120 with information that it can use to best determine what corrective action to take. For example, additional information for a read command can include, but is not limited to, whether there was an uncorrectable ECC error, the number of bits corrected, cyclical redundancy check (CRC) information, whether the read command was part of a copy operation, the page number associated with the read command, whether the data needs to be scrubbed, whether a timeout occurred, and whether the read memory location is near its read threshold. Additional information for a program command can include, but is not limited to, CRC/transmission information, bad block information, recovery information, whether a spare block is needed, whether the block is invalid, whether the write command was part of a copy operation, whether a timeout occurred, whether a power loss occurred, and an identification of the last good page that was written. Additional information for an erase command can include, but is not limited to, an indication of failure, whether a block needs to be replaced, whether a spare block is needed, whether a block is invalid, and whether a timeout occurred. Additionally, other "miscellaneous" information may be provided, such as, but not limited to, whether the memory has run out of spare blocks, whether the command is part of a copy operation, whether there was a non-error request/attention from the target, whether the extended status register 113 is nearing overflow, the status of background operations (discussed below), and various operational statistics.

Figure 8:
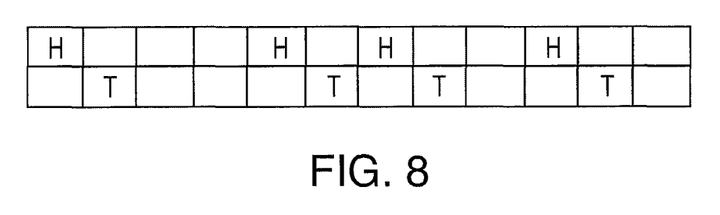
FIG. 8 is a chart showing synchronous host and target communication of an embodiment.

Second, as was discussed above in conjunction with FIG. 7 and as diagrammatically illustrated in FIG. 8, the ONFI standard uses synchronous host and target communication, wherein the target only responds with the result of the status register 112 after being queried by the host 120. In this way, the ONFI standard is a master-slave storage protocol, allowing only the host 120 to initiate transactions (e.g., erase, program, and read), and the target only provides status information when the status register 112 is explicitly read by the host 120, which is typically done synchronously with command completion. A problem can occur if the controller 100 uses "background commands" that are initiated by the controller 100 and not by the host 120. As used herein, a "background command" refers to a command for an operation that can be preempted/interrupted by a foreground command and continued at a later time. A "foreground command" refers to a command for an operation that is preferably performed to completion without being interrupted and typically has a predetermined completion time. A foreground command is typically issued by the host controller 121 and sent to the NAND controller 100 for execution. A background command can be performed whenever possible when no host foreground commands are currently being executed. Unlike foreground commands which typically have a predetermined completion time, background commands can have an uncertain completion time, depending on how much they are interrupted by foreground commands. More information about the use of background commands can be found in U.S. patent application Ser. No. 12/982,833, which is hereby incorporated by reference. As discussed in that application, a background command can include, but is not limited to, the following operations: data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks).

Figure 9:
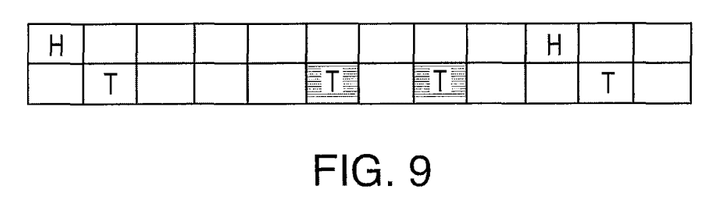
FIG. 9 is a chart showing asynchronous host and target communication of an embodiment.

As illustrated diagrammatically in FIG. 9, when the controller 100 issues background or internal-type command that are not strictly tied to a synchronous host command, the controller 100 may generate status information even though not currently being spoken to by the host 120. However, since under the ONFI standard, the controller 100 "speaks" to the host 120 only after being "spoken to" by the host 120, the controller 100 is unable to report the status of background or internal events to the host 120. That is, there is no asynchronous communication between the controller 100 and the host 120 in the ONFI standard because the master/slave orientation of the ONFI protocol does not support asynchronous event reporting by the controller 100 back to the host 120.

One possible solution to these problems is to add a vendor-specific command or processing extension, which is supported by ONFI. Typically, functional extensions are supported by hardware "hooks" but are implemented by add-on firmware routines. Accordingly, when a vendor-specific flag is set in the status register 112, the add-on firmware routines can read out additional information about what caused an error for a specific event. However, the use of vendor-specific flags in this manner may result in inefficient operation when the host 120 uses a hardware command accelerator as an automation mechanism for executing basic ONFI commands. Hardware command accelerators reduce firmware and software interactions with the ONFI bus protocol, which typically is slower than hardware processing. The problem is presented when an off-the-shelf ONFI standard host controller provides acceleration for only a subset of standard ONFI commands and no acceleration for vendor specific commands. In such a situation, there is likely to be a performance impact if the presence of a vendor-specific flag will cause a halting of the hardware command accelerator. This is illustrated in FIG. 10.

Figure 10:
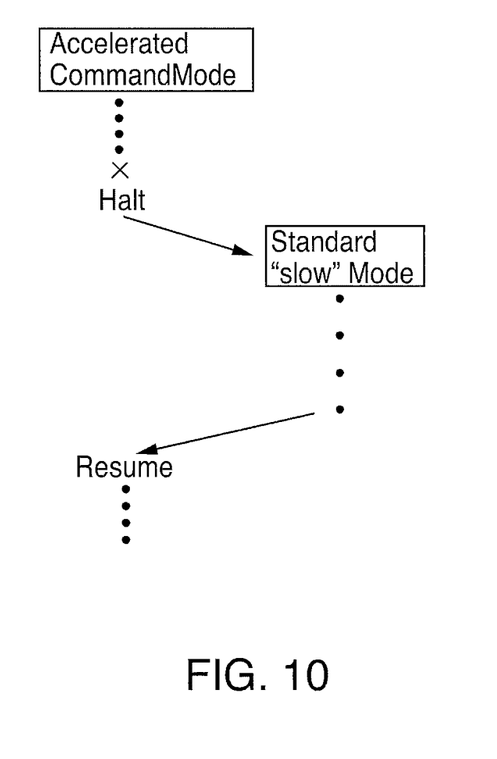
FIG. 10 is an illustration of the operation of a hardware command accelerator of an embodiment.

As shown in FIG. 10, when the controller 100 is operating in an accelerated command mode, it can process certain commands (e.g., read, program, erase, read status, and copyback without data modification) in an accelerated manner by using hardware processing. However, when the controller 100 encounters a "non-accelerated" command, such as a vendor-specific command, the controller 100 will halt the accelerated command mode and enter into the standard (slower) mode. (Examples of other "non-accelerated" commands can include, but are not limited to, a read parameter page command, a get/set features command, and a command to track/handle an error response.) In operation, as discussed above, the host 120 would issue a read status command after every program, erase, or read command. If the FAIL bit is set in the status register 112, the controller 100 would halt the accelerated command mode sequencer, go into standard (slow) mode and issue a vendor specific command (e.g., to read additional error information). Then, the controller 100 would return to accelerated command mode after any necessary action has been taken. Switching between accelerated and standard modes can introduce idle "bubbles" into an otherwise high throughput command and data stream, which can negatively impact overall performance depending on how often the accelerated command mode sequencer is halted. That is, if switching between accelerated mode and standard mode is costly enough in added latency, it may significantly reduce the overall achievable storage performance.

To address the problems noted above while avoiding the disadvantages associated with vendor-specific commands, these embodiments use an extended status register 113 in the controller 100 to store status information of a plurality of events in time across the plurality of flash memory devices 130. The extended status register stores event status information, whereas the ONFI status register stores command status information. These embodiments provide a more sophisticated error and event handling mechanism that efficiently conveys extended error and status information in a high performance manner for both synchronous and asynchronous commands from an ONFI target device back to an ONFI host. This mechanism can also beneficially provide an extensible status reporting method to a central host controller from attached devices (e.g., targets/NAND device clusters) on each ONFI channel and across several ONFI channels, as is typical for a SATA-based solid-state drive (SSD) application.

Figure 11:
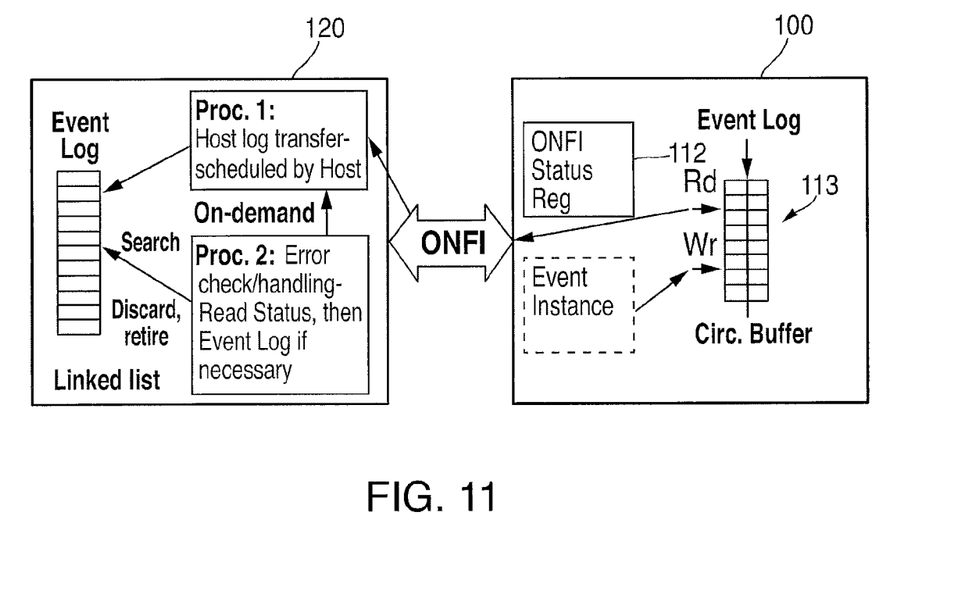
FIG. 11 is an illustration of a controller with an extended status register of an embodiment.

FIG. 11 is a diagram illustrating the use of the extended status register 113 in one embodiment. The extended status register 113 is a memory (e.g., buffer space) in the controller 100 and can be either a separate, dedicated memory device or a memory area in a shared memory device. As shown in FIG. 11, for every "event" taking place in the plurality of flash memory devices 130, status information about that event instance is written into the extended status register 113. An "event" can include a program, read, or erase command from the host 120, a background command, a command internally generated by the controller 110, internal maintenance operations, storage resource reporting, operational statistical information, or other information/activity associated with the plurality of flash memory devices 130. The extended status register stores event status information, whereas the ONFI status register stores command status information. For example, for a read command, the event status information stored in the extended status register 113 can include, but is not limited to, whether there was an uncorrectable ECC error, the number of bits corrected, cyclical redundancy check (CRC) information, whether the read command was part of a copy operation, the page number associated with the read command, whether the data needs to be scrubbed, whether a timeout occurred, and whether the read memory location is near its read threshold. For a program command, the status information stored in the extended status register 113 can include, but is not limited to, CRC/transmission information, bad block information, recovery information, whether a spare block is needed, whether the block is invalid, whether the write command was part of a copy operation, whether a timeout occurred, whether a power loss occurred, and an identification of the last good page that was written. For an erase command, the status information stored in the extended status register 113 can include, but is not limited to, an indication of failure, whether a block needs to be replaced, whether a spare block is needed, whether a block is invalid, and whether a timeout occurred. Information about other "events" can include, but is not limited to, whether the memory has run out of spare blocks, whether the command is part of a copy operation, whether there was a non-error request/attention from the target, whether the extended status register 113 is nearing overflow, the status of background operations, and various operational statistics. Additional examples of the various types of status information that can be stored in the extended status register 113 are described in the next section.

As discussed above, the event log in the extended status register 113 can be used to provide additional command or system event status and information on internal error conditions. This extended event status provides greater detail and flexibility beyond the standard ONFI read status command. In this embodiment, the controller 100 is responsible for capturing the status of multiple events in time across the plurality of memory devices 130 and provides a mechanism for the host 120 to gather multiple results for possible corrective action.

Status information of a plurality of events in time across the plurality of flash memory devices 130 is referred to herein as an "event log." In operation, firmware in the controller 100 generates an immediate event error or status details for command exception conditions, internal maintenance operations, storage resource reporting, or operational statistical information. As appropriate, the controller 100 will set the relevant flag in the status register 112. The controller will also store information about the event instance in the extended status register 113. In one embodiment, the memory storing the extended status register 113 is a circular buffer (in one particular embodiment, having a maximum capacity of 8 KB). As such, the controller 100 can append each event instance to the tail of the event log circular buffer. The controller 100 can monitor where the head of the buffer is and can provide attention signaling to the host 120 if the buffer is near a full/over-write condition. The controller 100 can also post a warning to the event log, and, as the buffer nears capacity, can optionally set the FAIL flag in the ONFI status register 112, even if the ONFI command is otherwise successful just to get the host's urgent attention. The controller 100 can also set the FAIL flag if an unauthorized attempt is made to write to or erase the extended status register 113.

In this embodiment, the host 120 is responsible for reading the event log from the extended status register 113. Accordingly, in response to a request from the host 120 for the event log, the controller 100 returns the event log to the host 120 for analysis. This is referred to as "Proc. 1" in FIG. 11. A "ReadEventLog" command can be issued by the host 120 on a scheduled basis or on-demand to determine the cause of a FAIL bit detected in the ONFI status register 112 or when the host 120 expects other command status information to be returned from the controller 100. Optionally, the host 120 may periodically transfer the event log from the extended status register 113 to a mirror holding buffer on the host 120, as shown in FIG. 11, where it can later (or with a different thread) process the event instances recorded in the event log. In this situation, the host 120 would manage the available space of its "local" copy of the event log and discard entries when handling is complete. In "Proc. 2" shown in FIG. 11, the host 120 efficiently traverses its "local" event log as if it were in the controller 100 and analyzes the event log to determine what corrective action, if any, to take. By performing this analysis on the host 120 rather than on an event-by-event basis on the controller 100, this embodiment does not incur ONFI bus delays for reading each entry.

There are several advantages associated with these embodiments. First, by storing an event log of a plurality of events in time across the plurality of flash memory devices, the extended status register 113 of these embodiments conveys more information than the FAIL flag for a single event. By containing far more detail than the ONFI FAIL flag can contain, the extended status register 113 can provide the host 120 with information that it can use to best determine what corrective action to take. Additionally, because the host 120 retrieves the event log from the extended status register 113 on an aggregated basis rather than after each event, the host 120 need not synchronously respond to each event. Rather, it may process the event log from the extended status register 113 at more convenient intervals and will not "miss" transitory events. This allows the host 120 to collect status information not only for multiple synchronous commands (foreground commands), but also for asynchronous commands (background commands and commands that are internally generated by the controller 100). Also, because the host 120 retrieves the event log from the extended status register 113 on an aggregated basis rather than after each event, these embodiments avoid the performance issues that can be encountered with vendor-specific commands when the controller 100 needs to switch between accelerated and standard modes.

Exemplary Command Structures and Event Logs

As discussed above, the information stored in the extended status register 113 can take any suitable form and be formatted in any suitable way. This section provides exemplary command structures and event logs of an extended status register 113 of one particular implementation. It should be noted that this is merely an example to help illustrate this embodiment and should not be construed as a requirement.

In this embodiment, when the controller 110 provides out-of-band (OOB) extra status data to the host 120, the controller 100 prepares this data as a host-format packet and includes a generated CRC codeword in order for the host 120 to check for ONFI bus transmission errors. Since this data packet is prepared by the controller 100 and only returned to the host 120 over the ONFI bus, in one embodiment, there is no ECC code to protect against data errors. Alternatively, the host 120 can disable its CRC checking mechanism or receive and ignore CRC errors when this type of extra status data is read.

In one embodiment, the host 120 issues a ReadErrorEventLog command, and, in response to this command, the controller 100 provides specific error details on why the FAIL bit was set in the ONFI status register 112. In one implementation, the command has two field types of information: event summary and error event log. Event summary is a bitwise combination of all of the events that have occurred that may have caused the FAIL status to be set. The error event log is a log of all errors that have occurred. The Event Log may be formatted as a trace of events with details.

In one embodiment, the host 120 issues a ReadStatusEventLog command, which provides results or status details on command operations or system events. This command provides two types of information: statistics (e.g., available block level statistics) and the status event log (e.g., all types of events that are logged). Also in this embodiment, the events (errors and command results/status) are recorded for all LUNs in the available log buffer space (e.g., 8 KB). Alternatively, there can be a single event log (e.g., 0.5 KB) per LUN. As mentioned above, the buffer can be a cyclic arrays of entries, where each entry contains additional information about each event failure or result. At the points of critical controller 100 error, the firmware code can initiate an API call to the EventLog mechanism. The API will add information to the buffer of the related LUN.

In one particular implementation, the host 120 receives data of the event log in the format of several concatenated entries of predefined types. Each entry can be provided in type-length-value (TLV) format, as follows:

| Filed Name | Field Size | Field Description |
| --- | --- | --- |
| Type | 2 Bytes | A value uniquely identifying the type of the entry |
| Length | 2 Bytes | The length of 'Value' field in bytes |
| Value | (varies) | The data/value of the entry |

The following are examples of possible entries in the event log:

| Name | Type Value | Description |
| --- | --- | --- |
| Event-Summary | 60 h | A bitmap where each bit represents a certain possible error. The set bits reflect all the errors that are detailed in the EventLog Payload. |
| EventLog-Payload | 61 h | A detailed Log of events that occurred in the specified LUN before the EventLog has been retrieved by the host. |
| Terminator | FF00h | Indicates the end of the list of entries |

The EventLog payload is an entry of the EventLog command that lists all the errors and events in the form of descriptors. Each descriptor provides the details about the error (or event) that it describes. In one implementation, each descriptor has the following format (since the EventLog is read from the specific LUN, it is assumed the LUN number is the same for each of the described errors (events)):

| Filed Name | Field Size | Field Description |
| --- | --- | --- |
| Type | 1 Byte | A unique Id of the event/failure |
| Plane | 1 Byte | The number of the plane within the LUN |

-continued

| Filed Name | Field Size | Field Description |
|---|---|---|
| Block | 2 Bytes | Then number of the block (host address) within the plane |
| Page | 1 Byte | The number of the page within the block |
| Value 1 | 1 Byte | The value with the meaning according to the event type |
| Value 2 | 2 Bytes | The value with the meaning according to the event type |

The following is a summary of various events, in the format of a 32-bit values:

| Name | Bit | Operation | Description |
|---|---|---|---|
| UECC | 0 | Read | Unrecoverable ECC could not correct read failure at an address where read attempted, data is uncorrectable |
| SCTH | 1 | Read | Scrub Threshold. ECC errors above scrub threshold |
| EPR | 2 | Read | Erased Page Read Read page that was erased ( all 1's or all 0's ) |
| FPF | 3 | Program | Flash Program Failure due to Flash failure. Host should retry command. Address of program in Event Log. |
| NOBUF | 4 | Program, Read | Lack of available buffers. Host should Retry command For example on a program if there are no available buffers. |
| PFR | 5 | Program | Program Fail Recovery. A failure occurred on a program and was recovered using a spare block. |
| ERS_F | 6 | Erase | Erase Failure |
| RQ_SPR | 7 | Erase, Program | Need Decommission number spare blocks < threshold |
| W_CRC | 8 | Program | CRC Error Detected at FIM during Program |
| R_CRC | 9 | Read | CRC Error Detected at HIM |
| ATN_CRC | 10 | | CRC error was generated at HIM to indicate other problem |
| RQ_MV | 11 | Program | Move Required |
| BLK_INV | 12 | Erase, Program, Read | Host issued command addressed to an invalid block decommissioned block, block out of valid range etc. |
| LGP_DN | 13 | ScanLGP | Last good page (LGP) detection was completed. Process was completed and details are in Event Log. |
| CPP_F | 14 | Copy | Failure occurred in CopyPage: Read, write, index - address information of source and destination where failure occurred. |
| CPB_F | 15 | Copy | Failure occurred in CopyBlock: Read, write, index - address information of source and destination where failure occurred. |
| LUN_TO | 16 | Erase, Program, Read | LUN Timeout- No response from die |
| CMD_INV | 17 | | Illegal Command was received. Illegal Command Parameters |
| FATAL | 18 | | Fatal Error Occurred. |
| POR | 19 | | Power on Reset Occurred |

The following is a summary of the possible descriptors that can appear in the list of the EventLog Payload:

| Event Name | Action/Base Command | Description | Type | Plane | Bloc | Page | Val1 | Val2 |
|---|---|---|---|---|---|---|---|---|
| Must Retry Command - Lack of RAM Buffers | Read or Program | Last host command failed, since no buffers were available for this command. | 0x04 | V | | | | |
| Uncorrectable ECC | Read | Could not correct read failure. How many retries? | 0x00 | V | V | V | ECC page | |
| Correctable Read Above Scrub Threshold | Read | ECC-error count is above scrub threshold - do Emergency Data copy. Special re-read. | 0x01 | V | V | V | ECC page | ECC-errors count |
| Erased-Page Read | Read | The page requested on read is erased | 0x02 | V | V | V | ECC page | |
| Recoverable Program-to-Flash Failure | Program | Failure occurred while programming to flash. | 0x03 | V | V | V | | FIM status |
| Program-to-Flash Failure | Program | Program Fail - No spare available on plane. Need decommission. Host should retry. | | | | | | |
| Recoverable Erase Failure | Erase | Replaced failed erase block. Have n spares remaining on LUN m, plane n. | | | | | | |

| Event Name | Action/Base Command | Description | Descriptor Type | Plane | Bloc | Page | Val1 | Val2 |
|---|---|---|---|---|---|---|---|---|
| Erase Failure | Erase | Erase failure occurred with no spare block available. | 0x05 | V | V | | | FIM status |
| Need Decommission | — | Number spare blocks used to substitute bad-blocks is below the threshold | 0x06 | V | | | Blk type: S/MLC | |
| Decommission Block Result | — | Report remaining total spares per LUN, per plane | | | | | | |
| Program-to-Flash CRC Error | Program | CRC error detected in the host data while programmed to flash | 0x07 | V | V | V | | |
| LUN Timeout | — | No response from die | 0x0E | | | | | |
| Illegal Command | — | Illegal Command was received. Illegal Command Parameters | 0x0F | V | | | | |
| Fatal Error | — | Fatal Error occurred | 0x10 | | | | | |

CONCLUSION

It is intended that the foregoing detailed description be understood as an illustration of selected forms that the invention can take and not as a definition of the invention. It is only the following claims, including all equivalents that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A controller comprising:
a first interface through which to communicate with a host;
a plurality of second interfaces through which to connect to a plurality of flash memory devices in parallel, wherein each of the plurality of flash memory devices comprises a three-dimensional memory;
a status register;
an extended status register, wherein the extended status register is a circular buffer; and
a processor in communication with the first and second interfaces, the status register, and the extended status register, wherein the processor is operative to:
store, in the extended status register, status information of a plurality of events in time across the plurality of flash memory devices by appending each event instance to a tail of the circular buffer;
monitor a head of the circular buffer to detect when the circular buffer is near a full/over-write condition;
in response to detecting that the circular buffer is near the full/over-write condition, set a fail indicator in the status register even though a present event is successful and does not, on its own, warrant the fail indicator being set in the status register;
receive a request from the host for the status information of the plurality of events; and
in response to the request, provide the status information of the plurality of events to the host for analysis, wherein the host receives the status information of the plurality of events on an aggregated basis rather than after each event;
wherein the status information includes an indication that the processor detected a failure in programming a page of data to a block of memory in the plurality of flash memory devices and copied that page and preceding pages in the block to a replacement block in the plurality of flash memory devices.

2. The controller of claim 1, wherein the processor is further operative to receive a command from the host for corrective action after the host analyzes the status information of the plurality of events.

3. The controller of claim 1, wherein the host requests status information on a scheduled basis.

4. The controller of claim 1, wherein the host requests status information on demand.

5. The controller of claim 1, wherein at least one of the events comprises a command issued by the host.

6. The controller of claim 1, wherein at least one of the events comprises an internal command issued by the controller.

7. The controller of claim 1, wherein at least one of the events comprises a read command, a program command, an erase command, or a background command.

8. The controller of claim 1, wherein the status information comprises one or more of the following: information on command exception conditions, information on internal management operations, information on storage resource reporting, and information on operational statistical information.

9. A method for providing status information of a plurality of events in time across a plurality of flash memory devices, the method comprising:
performing in a controller comprising a first interface through which to communicate with a host, a second interface through which to connect to a plurality of flash memory devices in parallel, wherein each of the plurality of flash memory devices comprises a three-dimensional memory, a status register, a extended status register, and a processor, wherein the extended status register is a circular buffer:
storing, in the extended status register, status information of a plurality of events in time across the plurality of flash memory devices by appending each event instance to a tail of the circular buffer;
monitoring a head of the circular buffer to detect when the circular buffer is near a full/over-write condition;
in response to detecting that the circular buffer is near the full/over-write condition, setting a fail indicator in the status register even though a present event is successful and does not, on its own, warrant the fail indicator being set in the status register;

receiving a request from the host for the status information of the plurality of events; and in response to the request, providing the status information of the plurality of events to the host for analysis, wherein the host receives the status information of the plurality of events on an aggregated basis rather than after each event;

wherein the status information includes an indication that the processor detected a failure in programming a page of data to a block of memory in the plurality of flash memory devices and copied that page and preceding pages in the block to a replacement block in the plurality of flash memory devices.

10. The method of claim 9 further comprising receiving a command from the host for corrective action after the host analyzes the status information of the plurality of events.

11. The method of claim 9, wherein the host requests status information on a scheduled basis.

12. The method of claim 9, wherein the host requests status information on demand.

13. The method of claim 9, wherein at least one of the events comprises a command issued by the host.

14. The method of claim 9, wherein at least one of the events comprises an internal command issued by the controller.

15. The method of claim 9, wherein at least one of the events comprises a read command, a program command, an erase command, or a background command.

16. The method of claim 9, wherein the status information comprises one or more of the following: information on command exception conditions, information on internal management operations, information on storage resource reporting, and information on operational statistical information.

17. The method of claim 9, wherein the extended status register is a circular buffer.

18. The method of claim 17 further comprising sending an alert or forcing a failure when the circular buffer reaches a capacity threshold.

19. The controller of claim 1, wherein the processor is further operative to receive multiple read or write requests for individual pages and to simultaneously handle the multiple read or write requests.

20. The controller of claim 1 further comprising a read scrubbing module configured to detect if a number of soft error rates encountered when reading a block of memory in the plurality of flash memory devices exceeds a threshold, wherein, if the number of soft error rates exceeds the threshold, the processor is operative to copy data in the block to another block in the plurality of flash memory devices.

21. The controller of claim 1, wherein the first and second NAND interfaces are toggle mode interfaces.

22. The method of claim 9, wherein the processor is further operative to receive multiple read or write requests for individual pages and to simultaneously handle the multiple read or write requests.

23. The method of claim 9 further comprising a read scrubbing module configured to detect if a number of soft error rates encountered when reading a block of memory in the plurality of flash memory devices exceeds a threshold, wherein, if the number of soft error rates exceeds the threshold, the processor is operative to copy data in the block to another block in the plurality of flash memory devices.

24. The method of claim 9, wherein the first and second NAND interfaces are toggle mode interfaces.

* * * * *